No. 745,458. PATENTED DEC. 1, 1903.
F. C. PERKINS.
ELECTRICAL INCUBATOR.
APPLICATION FILED JULY 30, 1903.
NO MODEL. 2 SHEETS—SHEET 1.
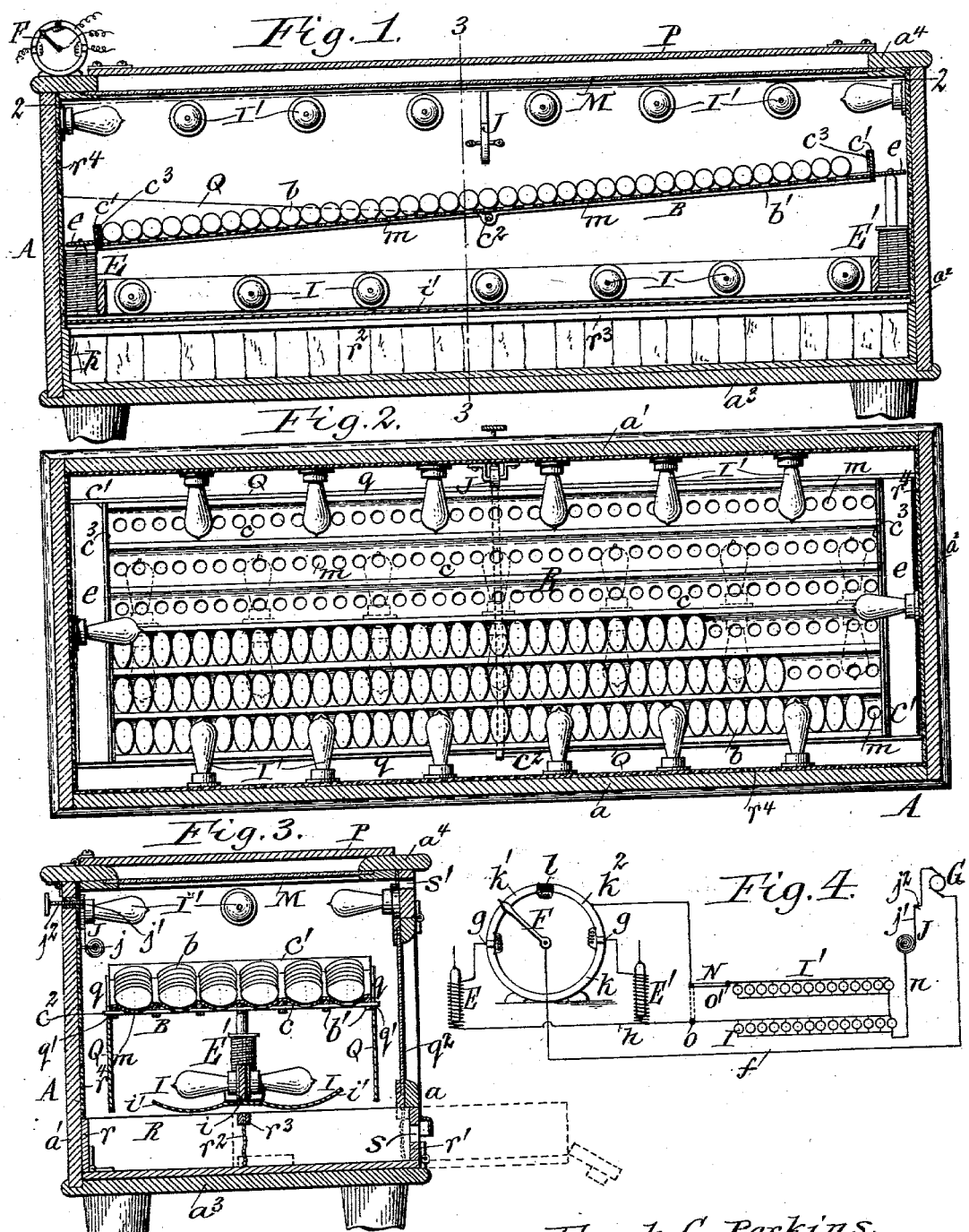

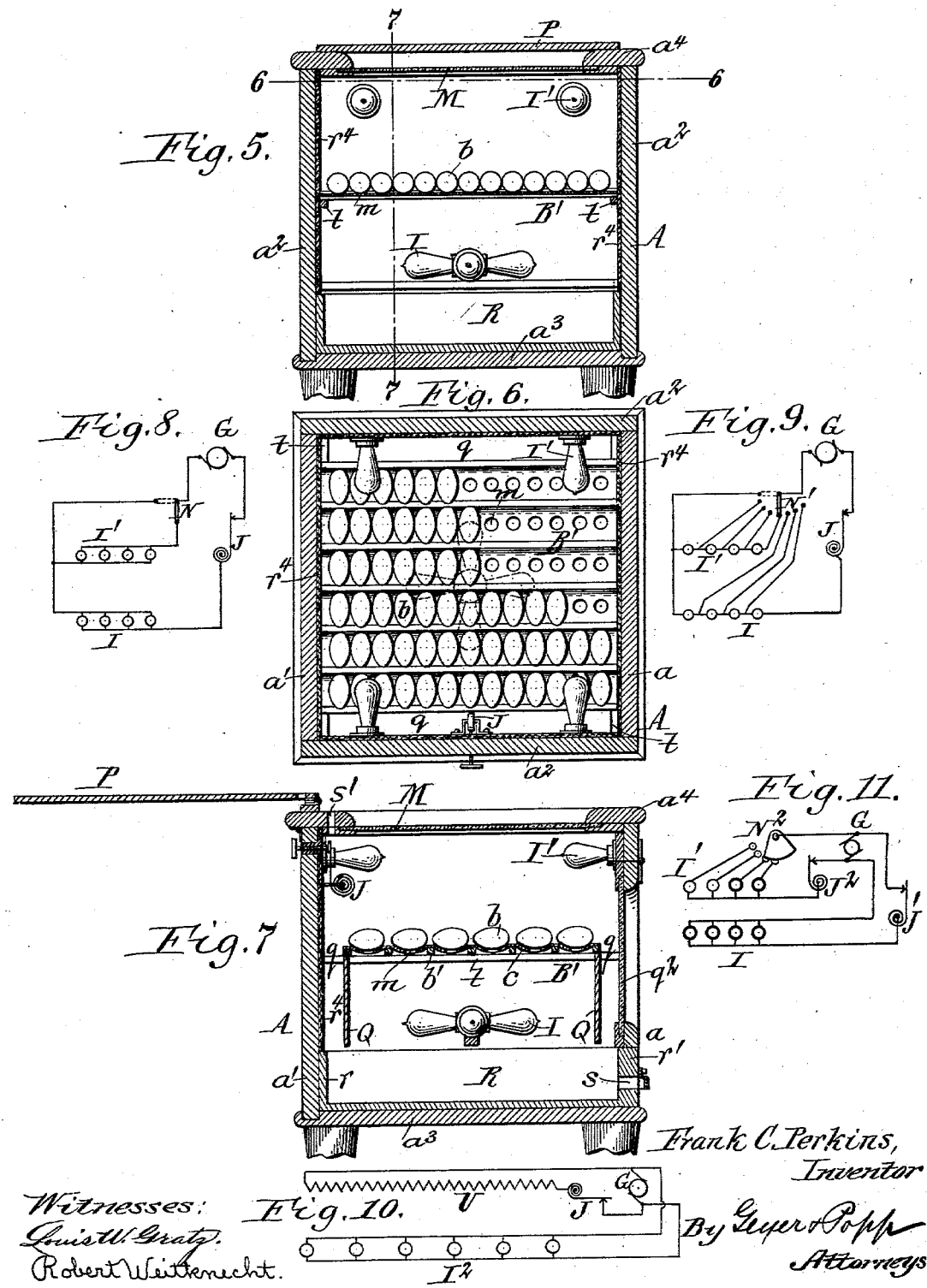

No. 745,458. Patented December 1, 1903.

UNITED STATES PATENT OFFICE.

FRANK CLINTON PERKINS, OF BUFFALO, NEW YORK.

ELECTRICAL INCUBATOR.

SPECIFICATION forming part of Letters Patent No. 745,458, dated December 1, 1903.

Application filed July 30, 1903. Serial No. 167,574. (No model.)

*To all whom it may concern:*

Be it known that I, FRANK CLINTON PERKINS, a citizen of the United States, residing at Buffalo, in the county of Erie and State of New York, have invented new and useful Improvements in Electrical Incubators, of which the following is a specification.

The principal object of this invention is to provide an incubator in which the eggs are hatched and the chicks are kept warm by means of an electric heater which, together with a thermostatic regulator, is arranged directly within the incubating-chamber.

Another object of this invention is to provide simple automatic means for turning the eggs and also cooling the same periodically.

This invention has the further object to so organize the incubator that the eggs may be readily tested without removing the same from the incubator.

In the accompanying drawings, consisting of two sheets, Figure 1 is a longitudinal sectional elevation of an incubator embodying my improvements. Fig. 2 is a horizontal section thereof in line 2 2, Fig. 1. Fig. 3 is a vertical transverse section in line 3 3, Fig. 1. Fig. 4 is a diagrammatic view showing one arrangement of wiring the electrical appliances of the incubator. Fig. 5 is a vertical section showing a modification of my improved incubator. Fig. 6 is a horizontal section thereof in line 6 6, Fig. 5. Fig. 7 is a vertical section in line 7 7, Fig. 5. Figs. 8, 9, 10, and 11 are diagrammatic views showing modifications of the electrical appliances of the incubator.

Similar letters of reference indicate corresponding parts throughout the several views.

Referring to Figs. 1 to 4, A represents the inclosing casing of the incubator, which preferably consists of longitudinal side walls $a\ a'$, transverse end walls $a^2$, a bottom $a^3$, and a top $a^4$. Within this chamber, between the top and bottom thereof, is arranged the rack or tray B, upon which the eggs $b$ are supported while being hatched. This tray preferably consists of a plurality of longitudinal bars $b'$, which are arranged lengthwise and parallel side by side in the incubating-chamber and connected by a covering consisting, preferably, of porous or perforated material, such as cloth or woven wire, which permits the passage of heat. That portion of the covering between the bars is depressed to form longitudinal troughs or channels $c$, each of said troughs being adapted to receive a longitudinal row of eggs. At opposite ends of the supporting-bars are arranged stop plates or guards $c'$, which project above the troughs and form closures at the ends of the troughs for preventing the eggs from rolling out of the same. For effecting the turning of the eggs the tray is pivoted at its middle, preferably by means of a transverse rod $c^2$, so that the tray can turn in a vertical plane. In practice each trough of the tray is nearly filled with a longitudinal row of eggs, a vacant space of sufficient length being left in the trough at one end thereof to permit the eggs to be reversed upon rolling the same in the tray. Upon tilting or oscillating the tray the eggs in each trough will roll alternately in opposite directions the extent of the clear space in said trough, which space is so determined that the eggs are arrested when the same have made a half-turn. The rocking movement of the tray alternately in opposite directions is effected by electrical means. As shown in Figs. 1 and 3, solenoid-electromagnets E E' are preferably employed for this purpose, the same being arranged within the chamber underneath opposite ends of the egg-tray. Each magnet has its coil preferably secured to the adjacent wall of the chamber, while its armature is secured at its upper end to a projection $e$ on the adjacent end of the tray. Upon energizing one of these magnets that end of the tray connected with its solenoid will be depressed and its opposite end raised, thereby causing the eggs to roll toward the depressed end of the tray and make half a turn. Upon now energizing the magnet connected with the elevated end of the tray and deënergizing the other magnet the tray will be tilted in the opposite direction, causing the eggs to be again turned by rolling toward the opposite end of the tray. For the purpose of preventing the end eggs from being broken by sudden contact with the stop-plates $c'$ the inner sides of the same are provided with a cushion-facing $c^3$, of felt or similar material. In order to cause this reversal of the eggs to be effected automatically at predetermined periods, an automatic switch is provided, whereby the coils of the solenoid-magnets are alternately connected with and disconnected from an electric generator. This switch may be of any suitable construction; but I prefer for this purpose that shown in Fig. 4, which is constructed as follows: F represents a rotary switch blade or arm which may be turned, say, once every twenty-four hours by a motor of any suitable construction—for instance, a spring-motor, such as is commonly used in clocks. This switch-arm is connected by a wire $f$ with one pole of an electric generator or dynamo G of any suitable construction. On diametrically opposite sides of this switch-arm are arranged two contacts $g$ $g$, each of which is connected with one end of one of the solenoid-magnet coils. The opposite ends of both coils are connected by a wire $h$, which is indirectly connected with the opposite pole of the electric generator. By this means the switch-arm upon rotating engages the contacts $g$ $g$ alternately at intervals of twelve hours, whereby the magnets are rendered alternately operative for oscillating the tray and turning the eggs twice a day.

Within the incubating-chamber is arranged an electric heater, which raises the temperature within the incubator sufficiently high to hatch the eggs and keep the resulting chicks warm. Although various means may be employed for translating electrical energy into heat suitable for this purpose, I prefer a plurality of incandesent lamps I I', because the same can be utilized not only for heating the incubator, but also as an illuminator to provide the necessary illumination for testing the eggs, as will be hereinafter described. As shown in the drawings, a set or group of incandescent electric lamps I is arranged in the incubating-chamber below the egg-tray, and a similar group of incandescent lamps I' is arranged in the chamber above the egg-tray. These lamps are so arranged relatively to one another and the egg-tray to produce practically a uniform temperature in all parts of the incubator. As shown in Figs. 1, 2, and 3, the lamps I' of the upper group are arranged around the inner side of the incubating-chamber, while the lamps I of the lower group are preferably mounted on opposite sides of a longitudinal bar $i$, which is arranged centrally in the lower part of the chamber and secured at opposite ends to the adjacent end walls of the chamber. These lamps may either be plain white or suitably colored to modify the light, if desired. The electrical circuit containing these lamps includes a thermostat J, which is arranged within the incubator or in a space communicating therewith and operates to control the electric circuit of the lamps. Various kinds of thermostats may be utilized for this purpose; but I prefer that shown in the drawings, which consists, essentially, of a coil $j$ of differential layers or strips of metal having its inner end secured to a fixed support, while its outer movable end carries an electric contact $j'$, which is engaged with and disengaged from a stationary contact $j^2$ of the circuit as the coil expands or contracts, due to the rise and fall of the temperature in the incubating-chamber. The stationary contact $j^2$ preferably consists of a screw which is accessible from the outside of the incubating-chamber and which upon being turned permits of varying the time of opening the lamp or heater circuit according to the degrees of temperature which it is desired to maintain in the incubator. In operation the thermostat closes the circuit and causes the lamps to be illuminated and generate heat, while if the temperature in the incubating-chamber rises above normal the thermostat opens the electric circuit and extinguishes the lamps, causing the temperature in the chamber to be reduced. After the temperature has again been reduced to normal the thermostat reëstablishes the electric circuit containing the lamps, whereby the latter are again lighted and generate heat.

It has been found in practice that the eggs require to be cooled off at intervals in order to produce proper incubation, and means have therefore been provided whereby this can be effected automatically. For this purpose the circuit of the heater-lamps is combined with the switch-arm F, and segmental contacts $k$ $k'$ $k^2$ are provided, with which said arm is adapted to engage. The lamp-contact $k$ extends in the form of a semicircle from one magnet-contact $g$ to the other, while the contacts $k'$ $k^2$ are in the form of quadrants and extend toward each other from opposite sides of the magnet-contacts and are separated at their opposing ends by an insulating-section $l$. The several heater or lamp contacts $k$ $k'$ $k^2$ are electrically connected with each other and with one side of the lamps, and as the switch-arm F sweeps over the same the lamps are placed in circuit and illuminated. As the arm sweeps over the insulating-section the circuit of the lamps is broken and the latter are extinguished. The insulating-section is of such length that the lamps will remain extinguished a sufficient time to effect the required cooling of the eggs. As shown in Fig. 4, one or both groups of lamps may form part of the electric circuit of the magnets when the latter are operative.

In order to permit of testing the eggs while the same are in the incubator, means are provided whereby the light in the incubator below the eggs is caused to illuminate the same and permit inspection thereof. As shown in Figs. 1, 2, and 3, each of the egg-troughs is provided with a plurality of openings $m$ in its lowermost part, over each of which except one an egg is located in the normal position of the tray. This causes the light from below the tray to shine upwardly through the eggs and permits of inspecting the quality of the eggs from above. By placing a glass pane M in the top of the chamber this inspection can take place from the outside of the incubator, thereby avoiding the necessity of opening the incubator and cooling the eggs while inspecting the same. Furthermore, the eggs may thus be under continuous examination throughout the period of incubation, and poor eggs may be removed without handling those in good condition. For the purpose of intensifying the light below the eggs during inspection the upper group of lamps at this time is cut out and the circuit is concentrated upon the lower group of lamps, this being accomplished by means of a switch N. It is immaterial as to the particular manner in which the lamps are coupled with the electric generator and other parts of the apparatus for accomplishing this result. As shown in Fig. 4, each group of lamps is connected in parallel, and the corresponding ends of both groups are connected by a wire $n$ with the movable contact $j'$ of the thermostat, while the stationary contact $j^2$ of the latter is connected with the pole of the dynamo opposite to that with which the contact-arm F is connected. The opposite ends of the groups of lamps are provided with contacts $o\ o'$, either of which can be engaged by the switch N, which is connected with the sectional contacts $k\ k'\ k^2$. When the incubator is in operation and the switch N is engaged with the contact $o'$ of the upper group of lamps, as shown in full lines in Fig. 4, the current from the dynamo passes through both groups in series, and the upper and lower parts of the incubating-chamber are both heated and illuminated, but not at full candle-power. When it is desired to test the eggs, the switch N is disengaged from the contact $o'$ of the upper group of lamps and engaged with the contact $o$ of the lower group of lamps, as shown by dotted lines in Fig. 4. In this position of the switch the current of the dynamo only passes through the lower set of lamps, the resistance of the upper lamps being cut out of circuit, thereby illuminating the lower lamps more brilliantly than when both sets of lamps are in use. This increased brilliancy of the lower lamps increases the illumination of the eggs from the bottom and permits of more easily detecting any defective eggs in the tray. After inspection the switch is restored to its position for placing the upper set of lamps again in circuit for resuming the normal operation of the incubator. The illumination of the eggs for testing the same may be further increased by reflecting the light in the lower part of the incubating-chamber upwardly. This can be done by applying white paint to the interior of the incubating-chamber below the tray between the partitions Q or by placing reflectors $i'$ underneath the lamps, as shown in Figs. 1 and 3. The interior of the chamber above the tray and the sides of the passages $q$ are preferably painted black to prevent reflection of light above the eggs.

In order to prevent the glass in the top of the incubating-chamber from being broken and to confine the heat, a cover P is provided, which is placed over the glass after inspection. This cover is preferably hinged on one side to the top of the incubating-chamber, and the top in turn is hinged to one side of the chamber to afford access to the latter from above for placing eggs upon the tray or removing the same therefrom.

After the chicks are hatched out of the eggs they are housed in the lower part of the incubator, which latter serves as a brooder until the chicks are sufficiently advanced to permit of removing the same from the incubator. In order to enable the chicks to thus pass from the tray into the lower part of the incubator-chamber, the tray is separated from the adjacent walls of the incubator at one or both sides by an intervening space $q$, through which the chicks drop from the tray into the space below the same. To prevent the light of the lower set of lamps from passing upwardly through the spaces $q$ and interfering with testing of the eggs, upright shutters or partitions Q are arranged lengthwise in the chamber on opposite sides of the egg-tray. These partitions extend upwardly far enough to engage the egg-tray in all positions of the latter and downwardly far enough to exclude the light-rays of the lower lamps from the passages $q$, as shown in Fig. 3. The egg-tray is preferably removably pivoted on the partitions Q by engaging or journaling the ends of the pivot-rod $c^2$ in bearing seats or notches $q'$ in the upper edges of the partitions. One of the walls of the incubating-chamber is preferably movable to permit the tray to be removed from the chamber for cleaning or filling the same. As shown in Fig. 3, the front wall or panel $a$ is hinged at its upper end to the chamber to permit of passing the tray into and out of the chamber, and this panel is also provided with a glass pane $q^2$ to permit of observing the condition of the chicks from the exterior. As the chicks drop through the passages $q$ they enter a drawer R, arranged in the lower part of the incubating-chamber. This drawer is removable through an opening in the side of the chamber and is preferably constructed so that the same may be utilized as a brooder. For this purpose the inner and outer walls $r\ r'$ of the drawer are hinged at their lower ends, and a flexible curtain $r^2$ is arranged across the central part of the drawer parallel with the wall of the chamber containing the opening through which the drawer passes. This curtain is supported at its upper end by a cross-bar $r^3$, which is mounted on the fixed end walls of the drawer. During the period of incubation the drawer is pushed into the chamber its fullest extent and the inner and outer walls thereof are turned upwardly into a vertical position, whereby the inner wall of the drawer lies against the rear side of the chamber and the front wall thereof is in line with the front side of the chamber, as shown in full lines, Fig. 3. In this position of the drawer the chicks drop into the same from the tray. When all of the chicks have been hatched and delivered into the drawer, the latter is drawn outwardly until the curtain is in line with the front side of the chamber, after which the inner wall is turned downwardly into a horizontal position and the front wall is turned downwardly into an inclined position, as shown by dotted lines in Fig. 3. In this position of the parts the chicks can pass freely through the curtain into and out of the incubating-chamber and also down upon a feeding-ground, if desired, by connecting an inclined board or runway with the inclined front wall of the drawer. By keeping the front wall of the drawer raised after the same is withdrawn the chicks are confined within the drawer.

In order to prevent undue radiation of heat from the incubator, the side walls thereof other than the glass panels are covered with asbestos or other non-conducting covering $r^4$, or the walls may be made double to form an insulating air-space between the same in a well-known manner. Suitable air inlet and outlet openings $s\ s'$ are also provided in the lower and upper parts of the incubating-chamber for maintaining the proper ventilation of the same.

If desired, the egg-tray may be rigidly supported within the incubating-chamber, which construction, however, necessitates turning the eggs manually. Such a construction is shown in Fig. 5, in which the tray B' is represented as mounted on horizontal cleats $t$ on the inner sides of the chamber. When it is desired to turn the eggs, the tray is slid outwardly upon the cleats and through an opening in the side of the chamber, which opening is normally closed by the adjacent hinged wall of the chamber.

Instead of hinging the front and rear walls of the drawer the same may be fixed as shown in Fig. 7.

When no means are employed for automatically turning the eggs, the wiring of the electric circuits may be simplified, as shown in Fig. 8. In this construction the thermostat is interposed between one pole of the generator and one side of one set of lamps, and the switch is arranged to connect the opposite pole of the generator with the opposite side of either one or both sets of lamps. This figure also shows each group of lamps arranged in multiple and the two groups connected in series. In Fig. 9 the lamps of both groups are connected in series and the switch N' is so constructed that any number of the lamps may be cut out.

Instead of employing electric lamps as the means of heating the interior of the incubating-chamber, the same effect may be produced by using any other well-known means for developing heat electrically. For instance, as shown in Fig. 10, a group of lamps $I^2$ is employed in the lower part of the incubating-chamber, while a resistance-coil U or other electric heater is employed in the upper part of the incubating-chamber.

If desired, the thermostat may be arranged to open and close an electric circuit which includes only part of the heating device, while the other part of the heating device may be arranged in an electric circuit which is constantly closed. Such an organization is shown in Fig. 10, in which the resistance-coil is controlled by the thermostat and the lamps are constantly in circuit.

In Fig. 11 is shown an arrangement of wiring in which the circuits of the upper and lower sets of lamps I I' are separate, and these circuits contain separate thermostats J' $J^2$, whereby each set of lamps is controlled independent of the other set. This figure also shows a switch $N^2$ for cutting in or out more or less of the lamps which are connected in multiple in the upper set.

It will be observed that in the several constructions described the heating or illuminating devices and the thermostat for regulating the heat are all contained within the incubating-chamber. This permits of a more compact and sightly construction and enables the incubator to be shipped more easily than one in which the heating devices are arranged partly outside of the incubating-chamber. Furthermore, by arranging the electric heater directly in the incubating-chamber and opening or closing its circuit by a thermostat also arranged within the chamber no heat is wasted, as is the case in heaters containing dampers or valves, whereby the heat is diverted from the incubating-chamber into the atmosphere when the chamber is too warm.

I claim as my invention—

1. The combination of an incubating-chamber, a tray for supporting eggs comprising a plurality of parallel troughs each of which is provided in its bottom with a row of openings over which eggs are adapted to be placed, and electric lamps arranged in said chamber below said tray, substantially as set forth.

2. The combination of an incubating-chamber, a tray for supporting eggs comprising a plurality of parallel troughs each of which is provided in its bottom with a row of openings over which eggs are adapted to be placed, electric lamps arranged in said chamber below the tray, and a thermostat also arranged in said chamber and controlling the circuit of said lamps, substantially as set forth.

3. The combination of an incubating-chamber, a tray for supporting eggs arranged in the chamber, electric lamps arranged in said chamber above and below said tray, and a switch for controlling the circuit of the lamps above the tray, substantially as set forth.

4. The combination of an incubating-chamber, an egg-tray arranged in said chamber and provided with openings over which the eggs are adapted to be placed, electric lamps arranged in the chamber above and below said tray, and a switch controlling the circuit of the lamps above the tray, substantially as set forth.

5. The combination of an incubating-chamber, an egg-tray arranged in said chamber and provided with openings over which the eggs are adapted to be placed, electric lamps arranged in the chamber above and below said tray, a thermostat arranged in said chamber and controlling the circuit of said lamps, and a manual switch controlling the circuit of the lamps, substantially as set forth.

6. The combination of an incubating-chamber provided in its top with a transparent pane, a horizontal egg-tray arranged in the chamber and provided with a plurality of openings over which eggs are adapted to be placed, electric lamps arranged in said chamber below said tray, and a switch for controlling said lamps, substantially as set forth.

7. The combination of an incubating-chamber, an egg-tray arranged in the chamber, electric lamps mounted on the walls of the chamber above the tray, a supporting-bar arranged centrally in the chamber below the tray, and electric lamps mounted on said bar, substantially as set forth.

8. The combination of an incubating-chamber, an egg-tray arranged in the chamber, electric lamps mounted on the walls of the chamber above the tray, a supporting-bar arranged centrally in the chamber below the tray and secured at its ends to the walls of the chamber, and electric lamps mounted on opposite sides of said bar, substantially as set forth.

9. The combination of an incubating-chamber, an egg-tray arranged in said chamber, an electric lamp arranged below the tray, and a reflector arranged below said lamp, substantially as set forth.

10. The combination of an incubating-chamber, an egg-tray arranged in said chamber provided with openings over which the eggs are placed, a bar arranged below the tray, electric lamps mounted on said bar, and a reflector arranged below the lamps and also mounted on said bar, substantially as set forth.

11. The combination of an incubating-chamber, an egg-tray arranged in said chamber and separated at its side from the wall of the chamber by an intervening passage, lamps arranged below the tray, and a partition or shutter extending downwardly from the side of the tray, substantially as set forth.

12. The combination of an incubating-chamber, an egg-tray arranged in said chamber and separated at opposite sides from the walls of the chamber, lamps arranged below the tray, and partitions extending from opposite sides of the tray downwardly below the lamps, substantially as set forth.

13. The combination of an incubating-chamber, an oscillating egg-tray arranged in said chamber and separated on opposite sides by intervening spaces from the adjacent walls of the chamber, upright partitions which are arranged in the chamber adjacent to the sides of the tray and upon the upper ends of which the tray is journaled, and lamps arranged in the chamber below the tray, substantially as set forth.

14. The combination of an incubating-chamber, an oscillating egg-tray arranged in said chamber, and an electromagnetic shifting device for operating said tray, substantially as set forth.

15. The combination of an incubating-chamber, an oscillating egg-tray pivoted centrally in said chamber, and means for shifting said tray consisting of electromagnets having their armatures connected with opposite ends of the tray, substantially as set forth.

16. The combination of an incubating-chamber, an oscillating egg-tray pivoted centrally in said chamber, and means for shifting said tray consisting of electromagnets having their armatures connected with opposite ends of the tray and a switch for directing an electric current alternately through the coils of said magnets, substantially as set forth.

17. The combination of an incubating-chamber provided in its top with a transparent pane, an egg-tray arranged in the chamber and provided with a plurality of openings over which eggs are adapted to be placed, electric lamps arranged in said chamber below said tray, and a drawer for receiving the chicks arranged in the chamber below the tray, substantially as set forth.

18. The combination of an incubating-chamber, an egg-tray arranged in said chamber, a drawer arranged below the tray and adapted to be withdrawn through an opening in the wall of the chamber, and a curtain arranged in the drawer parallel to said wall containing said opening, substantially as set forth.

19. The combination of an incubating-chamber provided with an opening in the lower part of one of its walls, an egg-tray arranged in said chamber above said opening, a drawer movable through said opening and provided with a hinged front wall which is adapted to close said opening, and a curtain arranged in the drawer parallel with the wall containing said opening, substantially as set forth.

20. The combination of an incubating-chamber provided with an opening in the lower part of one of its walls, an egg-tray arranged in said chamber above said opening, a drawer movable through said opening and provided with movable front and rear walls, and a curtain arranged in said drawer parallel with the wall containing said opening, substantially as set forth.

21. The combination of an incubating-chamber, an egg-tray arranged in said chamber, an electric heater for said chamber, and automatic means for periodically breaking the circuit of said heater, substantially as set forth.

22. The combination of an incubating-chamber, an egg-tray arranged in said chamber, an electric heater for said chamber, a thermostat arranged in said chamber and controlling the circuit of said heater, and automatic means for periodically breaking the circuit of said heater, substantially as set forth.

23. The combination of an incubating-chamber, an oscillating egg-tray arranged in said chamber, electromagnets for shifting said tray having their armatures connected with opposite ends of the tray, an electric heater arranged in said chamber, an electric generator having one pole connected with one side of the heater and the coils of said magnets, contacts connected with the opposite side of the heater and the magnet-coils, and a movable switch member connected with the other pole of the generator and adapted to engage successively with said magnet and heater contacts, substantially as set forth.

24. The combination of an incubating-chamber, an oscillating egg-tray arranged in said chamber, electromagnets for shifting said tray having their armatures connected with opposite ends of the tray, an electric heater arranged in said chamber and connected on one side with one end of said magnet-coils, a thermostat arranged in said chamber and interposed between one pole of an electric generator and said heater, a rotary contact-arm connected with the other pole of said generator, a pair of magnet-contacts arranged on opposite sides of said contact-arm and connected respectively with the opposite ends of said magnet-coils, segmental contacts arranged around said magnet-contacts and alternating with the same and connected with that side of the heater opposite the thermostat, and an insulating-section arranged between two adjacent contacts, said contact-arm being adapted to successively engage said contacts and insulating-section during its rotary movement, substantially as set forth.

Witness my hand this 25th day of July, 1903.

FRANK CLINTON PERKINS.

Witnesses:
   THEO. L. POPP,
   EMMA M. GRAHAM.